US010087312B2

(12) United States Patent
Matsushita et al.

(10) Patent No.: US 10,087,312 B2
(45) Date of Patent: Oct. 2, 2018

(54) RUBBER COMPOSITION AND TIRE CONTAINING RUBBER COMPOSITION

(71) Applicant: BRIDGESTONE CORPORATION, Chuo-ku, Tokyo (JP)

(72) Inventors: Junko Matsushita, Tachikawa (JP); Shojiro Kaita, Oizumi-machi (JP); Satoru Tamaki, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/832,869

(22) Filed: Dec. 6, 2017

(65) Prior Publication Data

US 2018/0094124 A1    Apr. 5, 2018

Related U.S. Application Data

(62) Division of application No. 14/383,363, filed as application No. PCT/JP2013/001416 on Mar. 6, 2013.

(30) Foreign Application Priority Data

Mar. 7, 2012 (JP) .................................. 2012-050995

(51) Int. Cl.
*C08L 9/00* (2006.01)
*B60C 1/00* (2006.01)
*C08L 7/00* (2006.01)
*C08F 36/08* (2006.01)

(52) U.S. Cl.
CPC .................. *C08L 9/00* (2013.01); *B60C 1/00* (2013.01); *B60C 1/0016* (2013.01); *C08F 36/08* (2013.01); *C08L 7/00* (2013.01)

(58) Field of Classification Search
CPC ............... C08L 9/00; C08L 7/00; C08F 36/08
See application file for complete search history.

(56) References Cited

U.S. PATENT DOCUMENTS

| 5,356,997 | A | 10/1994 | Massie, II et al. |
| 5,919,876 | A | 7/1999 | Castner |
| 6,066,705 | A | 5/2000 | Calderon et al. |
| 2004/0178163 | A1 | 9/2004 | Kerns et al. |
| 2008/0190532 | A1 | 8/2008 | Suzuki et al. |
| 2012/0048446 | A1 | 3/2012 | Kaszas et al. |

FOREIGN PATENT DOCUMENTS

| CN | 1526745 A | 9/2004 |
| CN | 104159932 A | 11/2014 |
| GB | 2037783 A | 7/1980 |
| JP | 53-90391 A | 8/1978 |
| JP | 2004-027179 A | 1/2004 |
| JP | 2006-503935 A | 2/2006 |
| RU | 2091400 C1 | 9/1997 |
| SU | 784298 A1 | 2/1992 |
| SU | 1712367 A1 | 2/1992 |
| WO | 2012/014456 A1 | 2/2012 |
| WO | 2012/014457 A1 | 2/2012 |

OTHER PUBLICATIONS

Communication dated Dec. 15, 2015, issued by the Japan Patent Office in corresponding Japanese Application No. 2012-050995.
Communication dated Oct. 20, 2015, from the State Intellectual Property Office of the People's Republic of China in counterpart Application No. 201380012801.3.
Communication dated Sep. 23, 2015 from the European Patent Office in counterpart European Application No. 13757224.4.
Shojiro Kaita et al., "An Efficient GadolinumMetallocene-Based Catalyst for the Synthesis of Isoprene Rubber with Perfect 1,4-Cis Microstructure and Marked Reactivity Difference between Lanthanide Metallocenes toward Dienes as probed by Butadiene—Isoprene Copolymerization Catalysis", Macromolecules, vol. 37, Oct. 7, 2004 (Oct. 7, 2004), pp. 5860-5862, XP002744305, DOI: 10.1021/nia0490350.
Database WPI, Week 199302, Thomson Scientific, London, GB; AN 1993-015988 XP002744308.
Database WPI Week 199821, Thomson Scientific, AN 1998-238240 XP002744307.
Database WPI, Week 199301, Thomson Scientific, AN 1993-006862 : XP002744306.
Communication dated Jul. 15, 2015 from the Russian Patent Office in counterpart application No. 2013140303.
International Search Report of PCT/JP2013/001416 dated May 14, 2013.

*Primary Examiner* — Peter D. Mulcahy
(74) *Attorney, Agent, or Firm* — Sughrue Mion, PLLC

(57) ABSTRACT

Provided is a rubber composition including a rubber component. The rubber component contains at least a polymer that is a synthesized polyisoprene or an isoprene copolymer and that has 20% or less gel fraction.

4 Claims, No Drawings

RUBBER COMPOSITION AND TIRE CONTAINING RUBBER COMPOSITION

CROSS REFERENCE TO RELATED APPLICATIONS

This application is a divisional application of pending U.S. application Ser. No. 14/383,363, filed Sep. 5, 2014, which is a 371 National Stage of International Application No. PCT/JP2013/001416, filed Mar. 6, 2013, claiming priority based on Japanese Patent Application No. 2012-050995, filed Mar. 7, 2012, the contents of all of which are incorporated herein by reference in their entirety.

TECHNICAL FIELD

The present invention relates to a rubber composition and a tire containing the rubber composition, and in particular, to a rubber composition that is capable of obtaining a crosslinked rubber composition with improved durability (i.e., breaking resistance and abrasion resistance) and a tire containing the rubber composition.

BACKGROUND ART

In light of the recent social demand for saving energy and resources, tires are now required to have high durability. To respond to this demand, rubber materials with high breaking resistance and abrasion resistance are also desired commonly. Further, a surge in natural rubber prices has created a need for developing synthetic rubber that exhibits durability equal to that of natural rubber.

To enhance durability of the synthetic rubber, the cis content of synthetic polyisoprene is conventionally increased to improve strain-induced crystallinity. Refer, for example, to JP 2006-503935 A (PTL 1) and JP S53-090391 A (PTL2).

However, the durability of the crosslinked rubber composition obtained with use of the conventional synthesized polyisoprene is not sufficient.

CITATION LIST

Patent Literature

PTL 1: JP 2006-503935 A
PTL 2: JP S53-090391 A

SUMMARY OF INVENTION

Technical Problem

The present invention is to provide a rubber composition that is capable of obtaining a crosslinked rubber composition with improved durability (i.e., breaking resistance and abrasion resistance) and a tire containing the rubber composition.

Solution to Problem

The present inventors considered that the durability of the crosslinked rubber composition obtained with use of the conventional synthesized polyisoprene was not sufficient because gel having a high-molecular weight in high dimensions was contained in the conventional synthesized polyisoprene.

The present inventors have found that a rubber composition including a rubber component containing at least a polymer that is a synthesized polyisoprene or an isoprene copolymer and that has 20% or less gel fraction provides a crosslinked rubber composition with improved durability (i.e., breaking resistance and abrasion resistance) than conventional synthesized rubber, and have made the present invention.

Meanwhile, although studies have been conducted on reduction of the amount of gel in a synthesized polyisoprene (e.g., refer to U.S. Pat. No. 5,919,876 A), a rubber composition containing a synthesized polyisoprene with a reduced gel amount has not yet been studied under the present circumstances.

The present invention provides a rubber composition including a rubber component containing at least a polymer that is a synthesized polyisoprene or an isoprene copolymer and that has 20% or less gel fraction.

The rubber composition including a rubber component containing at least a polymer that is a synthesized polyisoprene or an isoprene copolymer and that has 20% or less gel fraction provides a crosslinked rubber composition with increased strain-induced crystallinity and improved durability (i.e., breaking resistance and abrasion resistance).

The phrase "containing at least a polymer" means that the rubber component contains at least one of the synthesized polyisoprene and the isoprene copolymer.

"Synthesized polyisoprene" as used herein refers to an isoprene homopolymer obtained by polymerizing (or synthesizing) isoprene monomers. "Isoprene copolymer" as used herein refers to a copolymer composed of isoprene and a compound other than isoprene. The isoprene copolymer is obtained by polymerizing (or synthesizing) isoprene monomers and monomers of a compound other than isoprene. Both "synthesized polyisoprene" and "isoprene copolymer" encompass polymers having part of their polymer chains being denatured.

The gel fraction (unit: %) as used herein means a value obtained by: measuring a differential refractive index (RI) Ss (unit: m second) of a standard sample (gel fraction=0%), which is a filtrate obtained by passing a THF solution of polymer through a filter of GPC with a pore size of 0.45 μm; and using a calibration curve with the concentration (unit: mg/g) of the polymer in the THF solution on the horizontal axis and the differential refractive index (RI) Ss (unit: m second) on the vertical axis. Specifically, the gel fraction is calculated by (i) passing a THF solution of a target polymer, for which the gel fraction is to be obtained, through the above filter to measure a differential refractive index (RI) Sx (unit: m second) of the solution; (ii) calculating the differential refractive index (RI) Ss (unit: m second) of the standard sample (gel fraction=0%) of the concentration (unit: mg/g) of the THF solution containing the target polymer, for which the gel fraction is to be obtained, using the calibration curve prepared in advance; and (iii) substituting the measured Sx and the calculated Ss into the following expression (X):

$$\text{Gel fraction (\%)} = \{(Ss-Sx)/Ss\} \times 100 \quad\quad (X)$$

The rubber composition of the present invention preferably has a total amount of the polymer in the rubber component in an amount of 15 mass % to 100 mass %.

The rubber component containing the polymer by an amount in a range of 15 mass % to 100 mass % in total allows the polymer to exhibit its property satisfactorily.

The polymer of the present invention preferably has a 5% or less 3,4-vinyl bond content in a unit derived from the isoprene of the polymer.

The polymer having a 5% or less 3,4-vinyl bond content in a unit derived from the isoprene of the polymer enhances orientation of the polymer and improves strain-induced crystallinity.

The term "3,4-vinyl bond content" as used herein refers to the ratio of the 3,4-vinyl structure to the whole of the unit of isoprene.

The same definition applies to the terms "cis-1,4 bond content", "trans-1,4 bond content", and "1,2-vinyl bond content" as used herein.

In the rubber composition of the present invention, the polymer preferably contains a catalyst residue in an amount of 300 ppm or less.

The polymer having 300 ppm or less residual catalyst further ensures the formation of a network structure when the rubber composition is in vulcanization.

In the rubber composition of the present invention, the polymer preferably has a number average molecular weight (Mn) of 1.5 million or more when measured by gel permeation chromatography (GPC).

The polymer having a number average molecular weight (Mn) of 1.5 million or more when measured by gel permeation chromatography (GPC) provides strain-induced crystallinity satisfactorily when mixed with a rubber composition to thereby provide a crosslinked rubber composition with improved durability (i.e., breaking resistance and abrasion resistance).

In the polymer of the present invention, the polymer preferably contains nitrogen in an amount of less than 0.02 mass %.

The polymer containing nitrogen in an amount of less than 0.02 mass % more reliably reduces the generation of gel.

The rubber composition of the present invention further includes a filler. The amount of the filler contained in the rubber composition is preferably in a range of 10 mass parts to 75 mass parts per 100 mass parts rubber component.

The filler contained in an amount of 10 mass parts to 75 mass parts per 100 mass parts rubber component exhibits its effect and is reliably blended into the rubber component.

The rubber composition having the filler amount exceeding 75 mass parts per 100 mass parts rubber component may impair the workability.

The crosslinked rubber composition is obtained by crosslinking the rubber composition of the present invention.

The crosslinked rubber composition obtained by crosslinking the rubber composition improves the durability (i.e., breaking resistance and abrasion resistance) of the crosslinked rubber composition.

The tire of the present invention contains the rubber composition of the present invention.

The tire containing the rubber composition has improved durability (i.e., breaking resistance and abrasion resistance).

The tire of the present invention includes a tread member containing the rubber composition of the present invention.

The tire including the tread member having the rubber composition improves the durability (i.e., breaking resistance and abrasion resistance) of the tread member.

SUMMARY OF INVENTION

The present invention provides a rubber composition that is capable of obtaining a crosslinked rubber composition with improved durability (i.e., breaking resistance and abrasion resistance) and a tire containing the rubber composition.

DESCRIPTION OF EMBODIMENTS (Rubber Composition)

The rubber composition of the present invention contained at least a rubber component, and further contains a filler, a crosslinking agent, and other components as necessary.

<Rubber Components>

The rubber component contains at least a polymer, and further contains other rubber components as necessary.

<<Polymer>>

The aforementioned polymer is a synthesized polyisoprene or an isoprene copolymer.

The gel fraction in the polymer is not particular limited as long as it is 20% or less, and it may be selected as appropriate depending on the application thereof. The gel fraction is preferably 20% or less, more preferably 10% or less, and most preferably 5% or less.

The polymer having 20% or less gel fraction provides a crosslinked rubber composition with improved durability (i.e., breaking resistance and abrasion resistance).

The polymer having 20% or less gel fraction in the polymer is obtained by, for example, a polymerization of a predetermined time (30 minutes to 2 days) at a low temperature (−50° C. to 100° C.) using a first, a second, or a third polymerization catalyst composition, which will be described later.

The amount of residual catalyst in the polymer is not particular limited and may be selected as appropriate depending on the application thereof. The amount of residual catalyst is preferably 300 ppm or less (weight ratio), more preferably 200 ppm or less, and most preferably 100 ppm or less.

The polymer having a residual catalyst of 300 ppm or less would not inhibit the formation of a network structure in the rubber composition containing the polymer upon vulcanization. Such a polymer also prevents the reduction in the strain-induced crystallinity and in the durability.

The polymer having the residual catalyst in the above "more preferable" range is advantageous in terms of forming an effective crosslink network.

The residual catalyst can be measured, for example, by performing element analysis on the residual metals (e.g., aluminum and gadolinium) in the polymer.

The catalyst will be discussed in detail below upon describing the method of manufacturing the polymer.

The number average molecular weight (Mn) of the polymer is not particularly limited and may be chosen as appropriate depending on the application thereof. The number average molecular weight is preferably 1.5 million or more, more preferably 1.5 million to 2.0 million, and most preferably 1.5 million to 1.8 million. The polymer having a number average molecular weight (Mn) of 1.5 million or more provides a crosslinked rubber composition with sufficiently improved durability (e.g. breaking resistance and abrasion resistance). The polymer having the number average molecular weight (Mn) within the above "more preferable" or "most preferable" range is advantageous in terms of both the durability and processability.

Here, the number average molecular weight (Mn) is measured as a polystyrene conversion average molecular weight by gel permeation chromatography (GPC) at a temperature of 140° C. using polystyrene as a standard reference material.

The polymer having the number average molecular weight (Mn) of 1.5 million or more is obtained by, for example, a polymerization of a predetermined time (i.e., 30 minutes to 2 days) at a low temperature (i.e., −50° C. to 100° C.) using a first, a second, or a third polymerization catalyst composition, which will be described later.

Further, molecular weight distribution (Mw/Mn), represented by the ratio between the weight average molecular weight (Mw) and the number average molecular weight (Mn) of the polymer, is not particularly limited and may be selected as appropriate depending on the application thereof. Preferably, the molecular weight distribution is 4.0 or less and more preferably 3.0 or less. The molecular weight distribution (Mw/Mn) of 4.0 or less makes the physical property homogeneous. In the meantime, the molecular weight distribution (Mw/Mn) within the above "more preferable" range is advantageous in terms of low heat buildup properties. Here, the molecular weight distribution (Mw/Mn) is calculated from a weight average molecular weight (Mw) and a number average molecular weight (Mn) obtained as polystyrene conversion average molecular weights by gel permeation chromatography (GPC) at a measurement temperature of 140° C. using polystyrene as a standard reference material.

The nitrogen content in the polymer is not particularly limited and may be selected as appropriate depending on the application thereof. The nitrogen content of less than 0.02 mass % is preferable, and 0 mass % is more preferable.

The polymer having the nitrogen content of less than 0.02 mass % allows its protein-derived nitrogen content to be also less than 0.02 mass %. This low content prevents generation of gel due to protein and thus reduces the gel fraction.

The nitrogen content can be measured, for example, by performing element analysis.

<<<Synthesized Polyisoprene>>>

—Cis-1,4 Bond Content—

The cis-1,4 bond content in the synthesized polyisoprene is not particularly limited and may be selected as appropriate depending on the application thereof. The bond content is, however, preferably 90% or more, more preferably 95% or more, and most preferably 98% or more.

The synthesized polyisoprene having cis-1,4 bond content of 90% or more develops intended elongation-induced crystallinity.

The synthesized polyisoprene having the cis-1,4 bond content within the above "more preferable" or "most preferable" range is advantageous in terms of improved durability associated with strain-induced crystallinity.

—Trans-1,4 Bond Content—

The trans-1,4 bond content of the synthesized polyisoprene is not particularly limited and may be selected as appropriate depending on the application thereof. The bond content is, however, preferably 10% or less and more preferably 5% or less.

The synthesized polyisoprene having trans-1,4 bond content of 10% or less develops intended strain-induced crystallinity.

The synthesized polyisoprene having the trans-1,4 bond content within the above "more preferable" range is advantageous in terms of improved durability associated with strain-induced crystallinity.

—3,4-Vinyl Bond Content—

The 3,4-vinyl bond content of the synthesized polyisoprene is not particularly limited and may be selected as appropriate depending on the application thereof. The bond content is preferably is 5% or less and more preferably 2% or less.

The synthesized polyisoprene having the 3,4-vinyl bond content of 5% or less develops intended strain-induced crystallinity.

The synthesized polyisoprene having the 3,4-vinyl bond content within the above "more preferable" range is advantageous in terms of improved durability associated with strain-induced crystallinity.

—Method of Producing Synthesized Polyisoprene—

Next, a method of producing the synthesized polyisoprene will be described in detail. However, the producing method described in detail below is merely an example. The synthesized polyisoprene may be produced by polymerizing isoprene monomers in the presence of a polymerization catalyst composition.

The method of producing the synthesized polyisoprene includes at least a polymerization step, and further includes coupling, cleaning, and other steps arbitrarily selected as necessary.

—Polymerization Step—

The polymerization step is for polymerizing isoprene monomers.

In the polymerization step, except that a later-described first, second, or third polymerization catalyst composition is used, isoprene monomers may be polymerized in a manner similar to a general method of producing polymers using a coordination ion polymerization catalyst. The polymerization catalyst compositions used in the present invention will be described in detail later.

The catalyst that may be used in the polymerization step may be the first, second, or third polymerization catalyst composition, which will be described later.

An arbitrary method can be employed as the polymerization method including, for example, solution polymerization, suspension polymerization, liquid phase bulk polymerization, emulsion polymerization, vapor phase polymerization, and solid state polymerization. In addition, in the case of using a solvent for polymerization reaction, any solvent may be used that is inert to the polymerization reaction, including, for example, toluene, cyclohexane, n-hexane and mixtures thereof.

In the case of using a polymerization catalyst composition, the polymerization step can be carried out in either one of the following manners. That is, for example, (1) the components forming the polymerization catalyst composition may be separately provided in the polymerization reaction system containing isoprene monomers, to thereby prepare the polymerization catalyst composition in the reaction system, or (2) the polymerization catalyst composition prepared in advance may be provided into the polymerization reaction system. Further, the manner (2) also includes providing the metallocene complex (active species) activated by the co-catalyst.

Further, in the polymerization step, a terminator such as methanol, ethanol, and isopropanol may be used to stop the polymerization.

In the polymerization step, the polymerization reaction of the isoprene may be preferably performed in an inert gas atmosphere, and preferably in nitrogen or argon gas atmosphere. The polymerization temperature of the polymerization reaction is not particularly limited, and preferably in a range of, for example, −100° C. to 200° C., and may also be set to temperatures around room temperature. An increase in polymerization temperature may reduce the cis-1,4-selectivity in the polymerization reaction. The polymerization reaction is preferably performed under pressure in a range of 0.1 MPa to 10.0 MPa so as to allow the isoprene to be sufficiently introduced into polymerization system. Further, the reaction time of the polymerization is not particularly limited, and may preferably be in a range of, for example, 1 second to 10 days, which may be selected as appropriate depending on the conditions such as the type of the catalyst, and the polymerization temperature.

—First Polymerization Catalyst Composition—

One example of the first polymerization catalyst composition includes a polymerization catalyst composition including at least one complex selected from a group consisting of: a metallocene complex represented by the following general formula (I); a metallocene complex represented by the following general formula (II); and a half metallocene cation complex represented by the following general formula (III):

[Formula 1]

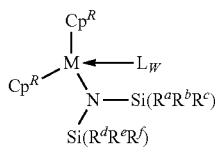
(I)

(In the formula (I), M represents a lanthanoid element, scandium, or yttrium; $Cp^R$ each independently represents an unsubstituted or substituted indenyl group; $R^a$ to $R^f$ each independently represent a hydrogen atom or an alkyl group having 1 to 3 carbon atoms; L represents a neutral Lewis base; and w represents an integer of 0 to 3.);

[Formula 2]

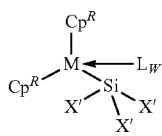
(II)

(In the formula (II), M represents a lanthanoid element, scandium, or yttrium; $Cp^R$ each independently represents an unsubstituted or substituted indenyl group; X' represents a hydrogen atom, a halogen atom, an alkoxy group, a thiolate group, an amide group, a silyl group, or a hydrocarbon group having 1 to 20 carbon atoms; L represents a neutral Lewis base; and w represents an integer of 0 to 3.); and

[Formula 3]

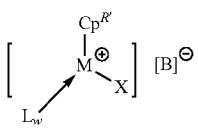
(III)

(In the formula (III), M represents a lanthanoid element, scandium, or yttrium; $Cp^{R'}$ each independently represents an unsubstituted or substituted cyclopentadienyl, indenyl, fluorenyl group; X represents a hydrogen atom, a halogen atom, an alkoxy group, a thiolate group, an amide group, a silyl group, or a hydrocarbon group having 1 to 20 carbon atoms; L represents a neutral Lewis base; w represents an integer of 0 to 3; and $[B]^-$ represents a non-coordinating anion.).

The first polymerization catalyst composition may further include another component such as a co-catalyst, which is contained in a general polymerization catalyst composition containing a metallocene complex. Here, the metallocene complex is a complex compound having one or more cyclopentadienyl groups or derivative of cyclopentadienyl groups bonded to the central metal. In particular, a metallocene complex may be referred to as half metallocene complex when the number of cyclopentadienyl group or derivative thereof bonded to the central metal is one.

In the polymerization system, the concentration of the complex contained in the first polymerization catalyst composition is preferably defined to fall within a range of 0.1 mol/L to 0.0001 mol/L.

In the metallocene complex represented by the general formulae (I) and (II) above, $Cp^R$ in the formulae represents an unsubstituted or substituted indenyl group. $Cp^R$ having an indenyl ring as a basic skeleton may be represented by $C_9H_{7-X}R_X$ or $C_9H_{11-X}R_X$. Here, X represents an integer of 0 to 7 or 0 to 11. R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. On the other hand, examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group. Specific examples of the substituted indenyl group include 2-phenyl indenyl and 2-methyl indenyl group. Two $Cp^R$ in the general formulae (I) and (II) may be the same as or different from each other.

In the half metallocene cation complex represented by the general formula (III), CpR' in the formula represents a substituted or unsubstituted cyclopentadienyl, indenyl, or fluorenyl group, with the substituted or unsubstituted indenyl group being preferred. $Cp^{R'}$ having a cyclopentadienyl ring as a basic skeleton is represented by $C_5H_{5-X}R_X$. Here, X represents an integer of 0 to 5. Further, R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a propyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group. $Cp^{R'}$ having a cyclopentadienyl ring as a basic skeleton is specifically exemplified as follows.

[Formula 4]

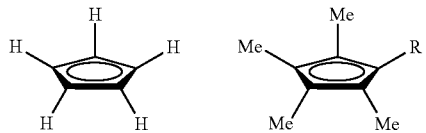

(In the formula, R represents a hydrogen atom, a methyl group, or an ethyl group.)

In the general formula (III), $Cp^{R'}$ having an indenyl ring as a basic skeleton is defined as the same as $Cp^R$ in the general formula (I), and preferred examples thereof are also the same as those of $Cp^R$ in the general formula (I).

In the general formula (III), $Cp^{R'}$ having the fluorenyl ring above as a basic skeleton may be represented by $C_{13}H_{9-X}R_X$ or $C_{13}H_{17-X}R_X$. Here, X represents an integer of 0 to 9 or 0 to 17. R independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. On the other hand, examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group.

The central metal represented by M in the general formulae (I), (II), and (III) represents a lanthanoid element, scandium, or yttrium. The lanthanoid elements include 15 elements with atomic numbers 57 to 71, and may be any one of them. Preferred examples of the central metal represented by M include samarium (Sm), neodymium (Nd), praseodymium (Pr), gadolinium (Gd), cerium (Ce), holmium (Ho), scandium (Sc), and yttrium (Y).

The metallocene complex represented by the general formula (I) includes a silyl amide ligand represented by [—N(SiR$_3$)$_2$]. Groups represented by R (R$^a$ to R$^f$ in the general formula (I)) in the silyl amide ligand each independently represent a hydrogen atom or an alkyl group having 1 to 3 carbon atoms, and it is preferred that at least one of R$^a$ to R$^f$ represents a hydrogen atom. With at least one of R$^a$ to R$^f$ representing a hydrogen atom, the catalyst can be synthesized with ease, and the height around silicon can be reduced, to thereby allow the non-conjugated olefin to be easily introduced. Based on the same objective, it is further preferred that at least one of R$^a$ to R$^c$ represents a hydrogen atom, and at least one of R$^d$ to R$^f$ represents a hydrogen atom. A methyl group is preferred as the alkyl group.

The metallocene complex represented by the general formula (II) includes a silyl ligand represented by [—SiX'$_3$]. X' in the silyl ligand represented by [—SiX'$_3$] is a group defined as the same as X in the general formula (III) described below, and preferred examples thereof are also the same as those of X in the general formula (III).

In the general formula (III), X represents a group selected from a group consisting of a hydrogen atom, a halogen atom, an alkoxy group, a thiolate group, an amide group, a silyl group, and a hydrocarbon group having 1 to 20 carbon atoms. In the general formula (III), the alkoxy group represented by X may be any one of aliphatic alkoxy groups such as a methoxy group, an ethoxy group, a propoxy group, an n-butoxy group, an isobutoxy group, a sec-butoxy group, and a tert-butoxy group; and aryl oxide groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group, with the 2,6-di-tert-butylphenoxy group being preferred.

In the general formula (III), the thiolate group represented by X may be any one of: aliphatic thiolate groups such as a thiomethoxy group, a thioethoxy group, a thiopropoxy group, a thio-n-butoxy group, a thioisobutoxy group, a thio-sec-butoxy group, and a thio-tert-butoxy group; and aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group, with the 2,4,6-triisopropylthiophenoxy group being preferred.

In the general formula (III), the amide group represented by X may be any one of: aliphatic amide groups such as a dimethyl amide group, a diethyl amide group, and a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tri-tert-butylphenyl amide group; and bistrialkylsilyl amide groups such as a bistrimethylsilyl amide group, with the bistrimethylsilyl amide group being preferred.

In the general formula (III), the silyl group represented by X may be any one of a trimethylsilyl group, a tris(trimethylsilyl)silyl group, a bis(trimethylsilyl)methylsilyl group, a trimethylsilyl(dimethyl)silyl group, and a triisopropylsilyl (bistrimethylsilyl)silyl group, with the tris(trimethylsilyl) silyl group being preferred.

In the general formula (III), the halogen atom represented by X may be any one of a fluorine atom, a chlorine atom, a bromine atom, and an iodine atom, with the chlorine atom and the iodine atom being preferred. Specific examples of the hydrocarbon group having 1 to 20 carbon atoms include: linear or branched aliphatic hydrocarbon groups such as a methyl group, an ethyl group, an n-propyl group, an isopropyl group, an n-butyl group, an isobutyl group, a sec-butyl group, a tert-butyl group, a neopentyl group, a hexyl group, and an octyl group; aromatic hydrocarbon groups such as a phenyl group, a tolyl group, and a naphthyl group; aralkyl groups such as a benzyl group; and hydrocarbon groups such as a trimethylsilylmethyl group and a bistrimethylsilylmethyl group each containing a silicon atom, with the methyl group, the ethyl group, the isobutyl group, the trimethylsilylmethyl group, and the like being preferred.

In the general formula (III), the bistrimethylsilyl amide group and the hydrocarbon group having 1 to 20 carbon atoms are preferred as X.

In the general formula (III), examples of the non-coordinating anion represented by [B]$^-$ include tetravalent boron anions. Examples of the tetravalent boron anion include tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra (tolyl)borate, tetra(xylyl)borate, (tripheyl, pentafluorophenyl)borate, [tris(pentafluorophenyl), phenyl]borate, and tridecahydride-7,8-dicarbaundecaborate, with the tetrakis (pentafluorophenyl)borate being preferred.

The metallocene complexes represented by the general formulae (I) and (II) and the half metallocene cation complex represented by the general formula (III) may include 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When a plurality of neutral Lewis bases represented by L are incorporated, respective L may be the same as or different from each other.

The metallocene complexes represented by the general formulae (I) to (II), and the half metallocene cation complex represented by the general formula (III) may be each present as a monomer or as a dimer or a multimer having more monomers.

The metallocene complex represented by the general formula (I) can be obtained by, for example, subjecting a lanthanoid trishalide, a scandium trishalide, or a yttrium trishalide to reaction in a solvent with a salt of indenyl (for example, a potassium salt or a lithium salt) and a salt of bis(trialkylsilyl)amide (for example, a potassium salt or a lithium salt). The reaction temperature only needs to be set to about room temperature, and thus the complex can be manufactured in mild conditions. In addition, reaction time is arbitrary, but about several hours to several tens of hours. A reaction solvent is not particularly limited, with a solvent that solves a raw material and a product being preferred, and for example, toluene may be used. In the following, a reaction example for obtaining the complex represented by the general formula (I) is described.

[Formula 5]

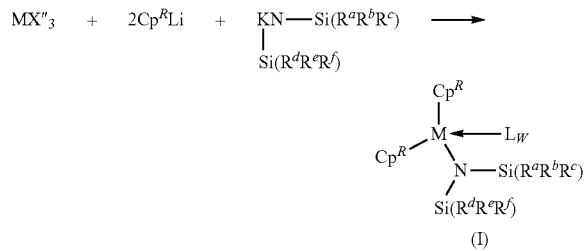

(In the Formula, X" represents a halide.)

The metallocene complex represented by the general formula (II) can be obtained by, for example, subjecting a lanthanoid trishalide, a scandium trishalide, or a yttrium trishalide to reaction in a solvent with a salt of indenyl (for example, a potassium salt or a lithium salt) and a salt of silyl (for example, a potassium salt or a lithium salt). The reaction temperature only needs to be set to about room temperature, and thus the complex can be manufactured in mild conditions. In addition, reaction time is arbitrary, but about several hours to several tens of hours. A reaction solvent is not particularly limited, with a solvent that solves a raw material and a product being preferred, and for example, toluene may be used. In the following, a reaction example for obtaining the complex represented by the general formula (II) is described.

[Formula 6]

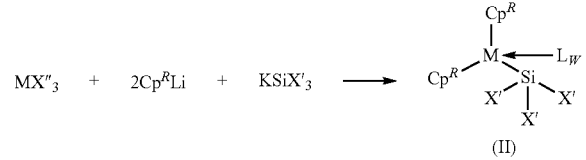

wherein X" represents a halide.

The half metallocene cation complex represented by the general formula (III) can be obtained by, for example, the following reaction:

[Formula 7]

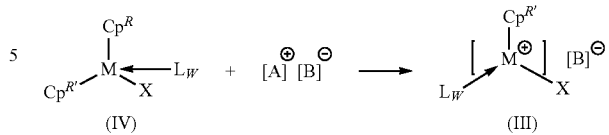

In the general formula (IV) representing a compound: M represents a lanthanoid element, scandium, or yttrium; $Cp^{R'}$ independently represents an unsubstituted or substituted cyclopentadienyl, indenyl, or fluorenyl; X represents a hydrogen atom, a halogen atom, an alkoxy group, a thiolate group, an amide group, a silyl group, or a hydrocarbon group having 1 to 20 carbon atoms; L represents a neutral Lewis base; and w represents an integer of 0 to 3. Further, in the general formula $[A]^+[B]^-$ representing an ionic compound, $[A]^+$ represents a cation; and $[B]^-$ represents a non-coordinating anion.

Examples of the cation represented by $[A]^+$ include a carbonium cation, an oxonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation. Specific examples of the tri(substituted phenyl)carbonium cation include a tri(methylphenyl)carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri(dimethylphenyl)phosphonium cation. Of those cations, the N,N-dialkylanilinium cations or the carbonium cations are preferred, and the N,N-dialkylanilinium cations are particularly preferred.

In the general formula $[A]^+[B]^-$ representing the ionic compound to be used in the above reaction is a compound obtained by combining any one selected from the non-coordinating anions described above and any one selected from the cations described above. Preferred examples thereof include N,N-dimethylanilinium tetrakis(pentafluorophenyl)borate and triphenylcarbonium tetrakis(pentafluorophenyl)borate. The ionic compound represented by the general formula $[A]^+[B]^-$ is added in an amount of preferably 0.1-fold mol to 10-fold mol and more preferably about 1-fold mol, with respect to the metallocene complex. When the half metallocene cation complex represented by the general formula (III) is used in polymerization reaction, the half metallocene cation complex represented by the general formula (III) may be directly supplied to the polymerization system, or alternatively, the compound represented by the general formula (IV) and the ionic compound represented by the general formula $[A]^+[B]^-$ may be separately supplied to the polymerization system, to thereby form the half metallocene cation complex represented by the general formula (III) in the reaction system. In addition, the half metallocene cation complex represented by the general formula (III) may be formed in the reaction system by using the metallocene complex represented by the general formula (I) or (II) and the ionic compound represented by the general formula [A]⁺[B]⁻ in combination.

Structures of the metallocene complex represented by the general formula (I) or (II) and of the half metallocene cation complex represented by the general formula (III) is preferably determined by X-ray crystallography.

The co-catalyst that can be contained in the first polymerization catalyst composition may be arbitrarily selected from components used as the co-catalyst for the general polymerization catalyst composition containing a metallocene complex. Preferred examples of the co-catalyst include aluminoxanes, organic aluminum compounds, and the above ionic compounds. These co-catalysts may be contained alone or in combination of two or more.

The aluminoxane is preferably an alkyl aluminoxane. Examples of the alkyl aluminoxane include methyl aluminoxane (MAO) and modified methyl aluminoxanes. In addition, preferred examples of the modified methyl aluminoxane include MMAO-3A (manufactured by Tosoh Finechem Corporation). A content of the aluminoxane in the first polymerization catalyst composition is preferably about 10 to 1,000, more preferably about 100, at an element ratio (Al/M) of the aluminum element Al of the aluminoxane to the central metal element M in the metallocene complex.

On the other hand, a preferred example of the organic aluminum compounds may include an organic aluminum compound represented by a general formula AlRR'R" (wherein R and R' each independently represent a hydrocarbon group of C1 to C10 or a hydrogen atom, and R" is a hydrocarbon group of C1 to C10). Examples of the organic aluminum compound include a trialkyl aluminum, a dialkyl aluminum chloride, an alkyl aluminum dichloride, and a dialkyl aluminum hydride, with the trialkyl aluminum being preferred. In addition, examples of the trialkyl aluminum include triethyl aluminum and triisobutyl aluminum. A content of the organic aluminum compound in the first polymerization catalyst composition is preferably 1-fold mol to 50-fold mol and more preferably about 10-fold mol, with respect to the metallocene complex.

In the polymerization catalyst composition, the metallocene complex represented by the general formulae (I) and (II) and the half metallocene complex represented by the general formula (III) may be combined with an appropriate co-catalyst, to thereby increase the cis-1,4 bond content and the molecular weight of a polymer to be obtained.

—Second Polymerization Catalyst Composition—

Next, the second polymerization catalyst composition will be described.

A preferred example of the second polymerization catalyst composition may include:

component (A): a rare earth element compound or a reactant of the rare earth element compound and a Lewis base, with no bond formed between the rare earth element and carbon; and component (B): at least one selected from a group consisting of: an ionic compound (B-1) composed of a non-coordinating anion and a cation; an aluminoxane (B-2); and at least one kind of halogen compound (B-3) from among a Lewis acid, a complex compound of a metal halide and a Lewis base, and an organic compound containing active halogen.

Further, if the polymerization catalyst composition contains at least one kind of the ionic compound (B-1) and the halogen compound (B-3), the polymerization catalyst composition further contains:

component (C): an organic metal compound represented by the following general formula (X):

$$YR^1{}_aR^2{}_bR^3{}_c \qquad (X)$$

wherein: Y is a metal selected from Group 1, Group 2, Group 12, and Group 13 of the periodic table; R¹ and R² are the same or different hydrocarbon groups each having 1 to 10 carbon atoms or a hydrogen atom; and R³ is a hydrocarbon group having 1 to 10 carbon atoms, in which R³ may be the same as or different from R¹ or R² above, with a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table.

The second polymerization catalyst composition used in the producing method is required to contain the above components (A) and (B), and if the polymerization catalyst composition contains at least one of the above ionic compound (B-1) and halogen compound (B-3), then it is further required to contain an organometallic compound represented by the following formula:

component (C): an organic metal compound represented by the following general formula (X):

$$YR^1{}_aR^2{}_bR^3{}_c \qquad (X)$$

wherein: Y is a metal selected from group 1, group 2, group 12 and group 13 of the periodic table; R¹ and R² each represent a hydrocarbon group having 1 to 10 carbon atoms or a hydrogen atom, the R¹ and R² being the same as or different from each other; and R³ is a hydrocarbon group having 1 to 10 carbon atoms, in which R³ may be the same as or different from R¹ and/or R², and furthermore, if Y is a metal selected from group 1 of the periodic table, then a is 1 and b and c are 0, if Y is metal selected from group 2 and group 12 of the periodic table, then a and b are 1 and c is 0, and if Y is a metal selected from group 13 of the periodic table, then a, b and c are 1.

The ionic compound (B-1) and the halogen compound (B-3) do not have carbon atoms to be fed to the component (A), and thus the component (C) becomes necessary as a source of feeding carbon to the component (A). Here, the polymerization catalyst composition still may include the component (C) even if the polymerization catalyst composition includes the aluminoxane (B-2). Further, the second polymerization catalyst composition may further include another component such as a co-catalyst, which is contained in a regular general rare earth element compound-based polymerization catalyst composition.

In the polymerization system, the concentration of the component (A) contained in the second polymerization catalyst composition is preferably defined to fall within a range of 0.1 mol/L to 0.0001 mol/L.

The component (A) contained in the second polymerization catalyst composition is a rare earth element compound or a reactant of the rare earth element compound and a Lewis base. Here, a rare earth element compound or a reactant of the rare earth element compound and a Lewis base do not have a direct bond of the rare earth element and carbon. When the rare earth element compound or a reactant thereof does not have a direct bond of a rare earth element and carbon, the resulting compound is stable and easy to handle. Here, the rare earth element compound refers to a compound containing a lanthanoid element, scandium, or yttrium. The lanthanoid elements include elements with atomic numbers 57 to 71 of the periodic table. Specific examples of the lanthanoid element include lanthanum, cerium, praseodymium, neodymium, promethium, samarium, europium, gadolinium, terbium, dysprosium, holmium, erbium, thulium, ytterbium, and lutetium. These components (A) may be contained alone or in combination of two or more.

The rare earth element compound is preferably composed of a rare earth metal of a bivalent or trivalent salt or of a complex compound, and further preferably a rare earth element compound containing at least one ligand selected from a hydrogen atom, a halogen atom, and an organic compound residue. Further, the rare earth element compound or the reactant of the rare earth element compound and the Lewis base is represented by the following general formula (XI) or (XII):

$$M^{11}X^{11}{}_2 \cdot L^{11}{}_w \quad (XI)$$

$$M^{11}X^{11}{}_3 \cdot L^{11}{}_w \quad (XII)$$

wherein: $M^{11}$ represents a lanthanoid element, scandium, or yttrium; $X^{11}$ each independently represent a hydrogen atom, a halogen atom, an alkoxy group, a thiolate group, an amide group, a silyl group, an aldehyde residue, a ketone residue, a carboxylic acid residue, a thicarboxylic acid residue, or a phosphorous compound residue; $L^{11}$ represents a Lewis base; and w represents 0 to 3.

Specific examples of a group (ligand) to form a bond to the rare earth element of the rare earth element compound include: a hydrogen atom; aliphatic alkoxy groups such as a methoxy group, an ethoxy group, a propoxy group, an n-butoxy group, an isobutoxy group, a sec-butoxy group, and a tert-butoxy group; a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group; aliphatic thiolate groups such as thiomethoxy group, a thioethoxy group, a thiopropoxy group, a thio-n-butoxy group, a thioisobutoxy group, a thio-sec-butoxy group, and a thio-tert-butoxy group; aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group; aliphatic amide groups such as a dimethyl amide group, a diethyl amide group, a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tert-butylphenyl amide group; bistrialkylsilyl amide groups such as a bistrimethylsilyl amide group; silyl groups such as a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group; halogen atoms such as a fluorine atom, a chlorine atom, a bromine atom, and an iodine atom. Other examples may include: residues of aldehyde such as salicylaldehyde, 2-hydroxy-1-naphthaldehyde, and 2-hydroxy-3-naphthaldehyde; residues of hydroxyphenone such as 2'-hydroxyacetophenone, 2'-hydroxybutyrophenone, and 2'-hydroxypropiophenone; residues of diketone such as acetylacetone, benzoylacetone, propionylaceton, isobutyl acetone, valerylacetone, and ethylacetylacetone; residues of an carboxylic acid such as an isovaleric acid, a caprylic acid, an octanoic acid, a lauric acid, a myristic acid, a palmitic acid, a stearic acid, an isostearic acid, an oleic acid, a linoleic acid, a cyclopentanecarboxylic acid, a naphthenic acid, an ethylhexanoic acid, a pivalic acid, a versatic acid (trade name of a product manufactured by Shell Chemicals Japan Ltd., a synthetic acid composed of a mixture of C10 monocarboxylic acid isomers), a phenylacetic acid, a benzoic acid, 2-naphthoate acid, a maleic acid, and a succinic acid; residues of thicarboxylic acid such as a hexanethioic acid, 2,2-dimethylbutanethioic acid, a decanethioic acid, and a thiobenzoic acid; residues of phosphoric acid ester such as a phosphoric acid dibutyl, a phosphoric acid dipentyl, a phosphoric acid dihexyl, a phosphoric acid diheptyl, a phosphoric acid dioctyl, phosphoric acid bis(2-ethylhexyl), a phosphoric acid bis(1-methylheptyl), a phosphoric acid dilauryl, a phosphoric acid dioleyl, a phosphoric acid diphenyl, a phosphoric acid bis(p-nonylphenyl), a phosphoric acid bis(polyethylene glycol-p-nonylphenyl), a phosphoric acid(butyl)(2-ethylhexyl), a phosphoric acid(1-methylheptyl)(2-ethylhexyl), and a phosphoric acid(2-ethylhexyl)(p-nonylphenyl); residues of phosphonic acid ester such as a 2-ethylhexyl phosphonic acid monobutyl, a 2-ethylhexyl phosphonic acid mono-2-ethylhexyl, a phenylphosphonic acid mono-2-ethylhexyl, a 2-ethylhexyl phosphonic acid mono-p-nonylphenyl, a phosphonic acid mono-2-ethylhexyl, a phosphonic acid mono-1-methylheptyl, and a phosphonic acid mono-p-nonylphenyl; residues of phosphinic acid such as a dibutylphosphinic acid, a bis(2-ethylhexyl) phosphinic acid, a bis(1-methylheptyl)phosphinic acid, a dilauryl phosphinic acid, a dioleyl phosphinic acid, a diphenyl phosphinic acid, a bis(p-nonylphenyl)phosphinic acid, a butyl(2-ethylhexyl) phosphinic acid, (2-ethylhexyl)(1-methylheptyl)phosphinic acid, an (2-ethylhexyl)(p-nonylphenyl) phosphinic acid, a butyl phosphinic acid, 2-ethylhexyl phosphinic acid, a 1-methylheptyl phosphinic acid, an oleyl phosphinic acid, a lauryl phosphinic acid, a phenyl phosphinic acid, and a p-nonylphenyl phosphinic acid. These ligands may be used alone or in combination of two or more.

As to the component (A) used in the second polymerization catalyst composition, examples of the Lewis base to react with the rare earth element compound may include: tetrahydrofuran; diethyl ether; dimethylaniline; trimethylphosphine; lithium chloride, neutral olefins, and neutral diolefins. Here, in the case where the rare earth element compound reacts with a plurality of Lewis bases (in the case where w is 2 or 3 in Formulae (XI) and (XII)), the Lewis base $L^{11}$ in each Formula may be the same as or different from each other.

The component (B) contained in the second polymerization catalyst composition is at least one compound selected from a group consisting of: an ionic compound (B-1); an aluminoxane (B-2); and a halogen compound (B-3). The total content of the component (B) contained in the second polymerization catalyst composition is preferably defined to fall within a range of 0.1-fold mol to 50-fold mol, with respect to the component (A).

The ionic compound represented by (B-1) is formed of non-coordinating anion and cation, and an example thereof includes: an ionic compound that reacts with the rare earth element compound as the component (A) or with the reactant resulting from Lewis base and the rare earth element compound, so as to form a cationic transition metal compound. Here, examples of the non-coordinating anion include: tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl) borate, tetra(tolyl)borate, tetra(xylyl)borate, (tripheyl, pentafluorophenyl)borate, [tris(pentafluorophenyl), phenyl] borate, and tridecahydride-7,8-dicarbaundecaborate. Meanwhile, examples of the cation may include a carbonium cation, an oxonium cation, an ammonium cation, a phosphonium cation, a cycloheptatrienyl cation, and a ferrocenium cation containing a transition metal. Specific examples of the carbonium cation include trisubstituted carbonium cations such as a triphenylcarbonium cation and a tri(substituted phenyl)carbonium cation, and more specific examples of the tri(substituted phenyl)carbonium cation include a tri(methylphenyl)carbonium cation and a tri(dimethylphenyl)carbonium cation. Examples of the ammonium cation include: trialkylammonium cations such as a trimethylammonium cation, a triethylammonium cation, a tripropylammonium cation, and a tributylammonium cation (such as a tri(n-butyl)ammonium cation); N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Specific examples of the phosphonium cation include triarylphosphonium cations such as a triphenylphosphonium cation, a tri(methylphenyl)phosphonium cation, and a tri(dimethylphenyl)phosphonium cation. Therefore, the ionic compound may preferably be a compound obtained by combining any one selected from the non-coordinating anions described above and any one selected from the cations described above. Specific examples thereof preferably include a N,N-dimethylanilinium tetrakis(pentafluorophenyl)borate and a triphenylcarbonium tetrakis(pentafluorophenyl)borate. These ionic compounds may be contained alone or in combination of two or more. The content of the ionic compound in the second polymerization catalyst composition is preferably 0.1-fold mol to 10-fold mol, and more preferably about 1-fold mol, with respect to the component (A).

The aluminoxane represented by (B-2) is a compound obtained by contacting an organic aluminum compound with a condensation agent, and examples thereof include: a chain type aluminoxane or a cyclic aluminoxane, both having a repeating unit represented by the general formula (—Al(R') O—) (wherein R' is a hydrocarbon group having 1 to 10 carbon atoms and may be partly substituted with halogen atom and/or alkoxy group, and the polymerization degree of the repeating unit is preferably at least 5, more preferably at least 10). Here, specific examples of R' include a methyl group, an ethyl group, a propyl group, and isobutyl group, with the methyl group being preferred. Further, examples of the organic aluminum compound used as a raw material of the aluminoxane may include: trialkyl aluminums such as trimethyl aluminum, triethyl aluminum, triisobutyl aluminum and the like; and mixtures thereof, with the trimethyl aluminum being particularly preferred. For example, an aluminoxane obtained using, as a raw material, a mixture of trimethyl aluminum and tributyl aluminum can be suitably used. The content of aluminoxane in the second polymerization catalyst composition is preferably about 10 to 1,000 at an element ratio (Al/M) of the aluminum element Al of the aluminoxane to the rare earth element M forming the component (A).

The halogen compound represented by (B-3) includes at least one of: a Lewis acid; a complex compound of a metal halide and a Lewis base; and an organic compound containing active halogen, and is capable of reacting with, for example, the rare earth element compound as the component (A) or with the reactant resulting from Lewis base and the rare earth element compound, so as to form compounds such as a cationic transition metal compound, a halogenated transition metal compound, or a compound with a charge-deficient transition metal center. The content of the halogen compound in the second polymerization catalyst composition is preferably 1-fold mol to 5-fold mol, with respect to the component (A).

Examples of the Lewis acid may include: a boron-containing halogen compound such as $B(C_6F_5)_3$ and an aluminum-containing halogen compound such as $Al(C_6F_5)_3$, and may also include a halogen compound containing an element of Group III, Group IV, Group V, Group VI, and Group VIII of the periodic table. Preferred examples thereof include an aluminum halide or an organometallic halide. Preferred examples of the halogen element include chlorine and bromine. Specific examples of the Lewis acid include: a methyl aluminum dibromide; a methyl aluminum dichloride; an ethyl aluminum dibromide; an ethyl aluminum dichloride; a butyl aluminum dibromide; a butyl aluminum dichloride; a dimethyl aluminum bromide; a dimethyl aluminum chloride; a diethyl aluminum bromide; a diethyl aluminum chloride; a dibutyl aluminum bromide; a dibutyl aluminum chloride; a methyl aluminum sesquibromide; a methyl aluminum sesquichloride; a ethyl aluminum sesquibromide; an ethyl aluminum sesquichloride; a dibutyltin dichloride; an aluminum tribromide; an antimony trichloride; an antimony pentachloride; a phosphorus trichloride; a phosphorus pentachloride; a tin tetrachloride; a titanium tetrachloride; and tungsten hexachloride, with the diethyl aluminum chloride, the ethyl aluminum sesquichloride, the ethyl aluminum dichloride, the diethyl aluminum bromide, the ethyl aluminum sesquibromide, and the ethyl aluminum dibromide being particularly preferred.

Preferred examples of the metal halide forming a complex compound of the metal halide and a Lewis base include: a beryllium chloride, a beryllium bromide; a beryllium iodide; a magnesium chloride; a magnesium bromide; a magnesium iodide; a calcium chloride; a calcium bromide; a calcium iodide; a barium chloride; a barium bromide; a barium iodide; a zinc chloride; a zinc bromide; a zinc iodide; a cadmium chloride; a cadmium chloride; a cadmium bromide; a cadmium iodide; a mercury chloride; a mercury bromide; a mercury iodide; a manganese chloride; a manganese bromide; a manganese iodide; a rhenium chloride; a rhenium bromide; a rhenium iodide; a copper chloride; a copper bromide; a copper iodide; a silver chloride; a silver bromide; a silver iodide; a gold chloride; a gold iodide; and a gold bromide, with the magnesium chloride, the calcium chloride, the barium chloride, the manganese chloride, the zinc chloride, and the copper chloride being preferred, and the magnesium chloride, the manganese chloride, the zinc chloride, and the copper chloride being particularly preferred.

Preferred examples of the Lewis base forming a complex compound of the metal halide and the Lewis base include: a phosphorus compound; a carbonyl compound; a nitrogen compound; an ether compound; and an alcohol. Specific examples thereof include: a tributyl phosphate; a tri-2-ethylhexyl phosphate; a triphenyl phosphate; a tricresyl phosphate; a triethylphosphine; a tributylphosphine; a triphenylphosphine; a diethylphosphinoethane; an acetylacetone; a benzoylacetone; a propionitrileacetone; a valerylacetone; an ethylacetylacetone; a methyl acetoacetate; an ethyl acetoacetate; a phenyl acetoacetate; a dimethyl malonate; a diphenyl malonate; an acetic acid; an octanoic acid; a 2-ethylhexoic acid; an oleic acid; a stearic acid; a benzoic acid; a naphthenic acid; a versatic acid; a triethylamine; a N,N-dimethylacetamide; a tetrahydrofuran; a diphenyl ether; a 2-ethylhexyl alcohol; an oleyl alcohol; stearyl alcohol; a phenol; a benzyl alcohol; a 1-decanol; and a lauryl alcohol, with the tri-2-ethylhexyl phosphate, the tricresyl phosphate; the acetylacetone, the 2-ethylhexoic acid, the versatic acid, the 2-ethylhexyl alcohol; the 1-decanol; and the lauryl alcohol being preferred.

The Lewis base is subjected to reaction with the metal halide in the proportion of 0.01 mol to 30 mol, preferably 0.5 mol to 10 mol, per 1 mol of the metal halide. The use of the reactant obtained from the reaction of the Lewis base can reduce residual metal in the polymer.

An example of the organic compound containing active halogen includes benzyl chloride.

The component (C) that is contained in the second polymerization catalyst composition is an organic compound represented by the general formula (X):

$$YR^1_a R^2_b R^3_c \qquad (X)$$

wherein: Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table), and is preferably an organic aluminum compound represented by the general formula (Xa):

$$AlR^1R^2R^3 \qquad (Xa)$$

wherein: $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above). Examples of the organic aluminum compound in the general formula (X) include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. The organic aluminum compounds as the component (C) may be contained alone or in combination of two or more. The content of the organic aluminum compound in the second polymerization catalyst composition is preferably 1-fold mol to 50-fold mol, and more preferably about 10-fold mol, with respect to the component (A).

—Third Polymerization Catalyst Composition—

The third polymerization catalyst composition includes the metallocene-based composite catalyst below and boron anion, and further preferably includes another component such as a co-catalyst, which is contained in a regular polymerization catalyst composition containing a metallocene complex. The third polymerization catalyst composition is also referred to as two-component catalyst, which has the metallocene-based composite catalyst and boron anion.

As is the case with the metallocene-based composite catalyst, the third polymerization catalyst composition further contains boron anion, which allows the content of each monomer component in the polymer to be arbitrarily controlled.

—Metallocene Catalyst—

The metallocene-based catalyst is represented by the following formula (A):

$$R_aMX_bQY_b \qquad (A)$$

wherein: R each independently represents an unsubstituted or substituted indenyl group, the R being coordinated with M; M represents a lanthanoid element, scandium, or yttrium; X each independently represents a hydrocarbon group having 1 to 20 carbon atoms, the X being m-coordinated with M and Q; Q represents a Group 13 element in the periodic table; Y each independently represents a hydrocarbon group having 1 to 20 carbon atoms or a hydrogen atom, the Y being coordinated with Q; and a and b each are 2.

Preferred examples of the above-described metallocene-based composite catalyst include a metallocene-based composite catalyst represented by the following formula (XV):

[Formula 8]

(XV)

wherein: $M^1$ represents a lanthanoid element, scandium, or yttrium; $Cp^R$ each independently represents an unsubstituted or substituted indenyl group; $R^A$ to $R^B$ each independently represent a hydrocarbon group having 1 to 20 carbon atoms, the $R^A$ and $R^B$ being μ-coordinated with $M^1$ and Al; and $R^C$ and $R^D$ each independently represent a hydrocarbon group having 1 to 20 carbon atoms or a hydrogen atom.

The use of the above metallocene-based polymerization catalyst enables the production of the polymer. The use of the metallocene-based composite compounds such as an aluminum-based catalyst can reduce or eliminate the amount of alkyl aluminum to be used in the step of synthesizing the polymer. The use of a conventional catalyst system would require a large amount of alkyl aluminum to be used in synthesizing a polymer. Specifically, to obtain high catalytic effect, the metallocene-based composite catalyst of the present invention requires only about 5 equivalents, whereas a conventional catalyst system would require alkyl aluminum in an amount of at least 10 equivalents relative to a metal catalyst.

In the metallocene-based composite catalyst, the metal represented by M in the formula (A) is a lanthanoid element, scandium, or yttrium. The lanthanoid elements include 15 elements with atomic numbers 57 to 71, and may be any one of them. Preferred examples of the metal represented by M include samarium (Sm), neodymium (Nd), praseodymium (Pr), gadolinium (Gd), cerium (Ce), holmium (Ho), scandium (Sc), and yttrium (Y).

In the formula (A), R each independently represents an unsubstituted or substituted indenyl, the R being coordinated with the metal M. Specific examples of the substituted indenyl group include a 1,2,3-trimethyl indenyl group, a heptamethyl indenyl group, and a 1,2,4,5,6,7-hexamethyl indenyl group.

In the formula (A), Q represents a Group 13 element in the periodic table. Specific examples thereof include: boron, aluminum, gallium, indium, and thallium.

In the formula (A), X each independently represents a hydrocarbon group having 1 to 20 carbon atoms, the X being m-coordinated with M and Q. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. The µ-coordination refers to a state of coordination which forms a crosslinked structure.

In the formula (A), Y each independently represents a hydrocarbon group having 1 to 20 carbon atoms or a hydrogen atom, the Y being coordinated with Q. Here, examples of the hydrocarbon group having 1 to 20 carbon atoms include, a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

In the formula (XV) above, the metal represented by $M^1$ is a lanthanoid element, scandium, or yttrium. The lanthanoid elements include 15 elements with atomic numbers 57 to 71, and may be any one of them. Preferred examples of the metal represented by $M^1$ include samarium (Sm), neodymium (Nd), praseodymium (Pr), gadolinium (Gd), cerium (Ce), holmium (Ho), scandium (Sc), and yttrium (Y).

In the formula (XV), $Cp^R$ represents an unsubstituted or substituted indenyl. $Cp^R$ having an indenyl ring as a basic skeleton may be represented by $C_9H_{7-X}R_X$ or $C_9H_{11-X}R_X$. Here, X represents an integer of 0 to 7 or 0 to 11, respectively. Further, R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. Meanwhile, examples of metalloid in the metalloid group include germyl (Ge), stannyl (Sn), and silyl (Si). In addition, the metalloid group preferably has a hydrocarbyl group, which is similar to the hydrocarbyl group described above. Specific examples of the metalloid group include a trimethylsilyl group. Specific examples of the substituted indenyl group include 2-phenyl indenyl and 2-methyl indenyl group. Two $Cp^R$ in the formula (XV) may be the same as or different from each other.

In the formula (XV), $R^A$ and $R^B$ each independently represent a hydrocarbon group having 1 to 20 carbon atoms, the $R^A$ and $R^B$ being µ-coordinated with $M^1$ and $A^1$. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. The µ-coordination refers to a state of coordination which forms a crosslinked structure.

In the formula (XV), $R^C$ and $R^D$ each independently represent a hydrocarbon group having 1 to 20 carbon atoms or a hydrogen atom. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

The metallocene-based composite catalyst can be obtained by, for example, reacting with an organic aluminum compound represented by $AlR^KR^LR^M$ in a solvent, the metallocene complex represented by the following formula (XVI):

[Formula 9]

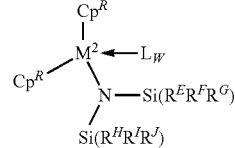

(XVI)

wherein: $M^2$ represents a lanthanoid element, scandium, or yttrium; $Cp^R$ each independently represents an unsubstituted or substituted indenyl group; $R^E$ to $R^J$ each independently represent a hydrogen atom or an alkyl group having 1 to 3 carbon atoms, L represents a Lewis base, and w represents an integer of 0 to 3. The reaction temperature only needs to be set to about room temperature, and thus the complex can be produced in mild conditions. The reaction time is arbitrary, and may be about several hours to several tens of hours. The reaction solvent is not particularly limited, and any solvent which is capable of dissolving the raw material and the product is preferably used. For example, toluene and hexane may be used. The structure of the metallocene-based composite catalyst may preferably be determined by $^1$H-NMR or X-ray crystallography.

In the metallocene complex represented by the formula (XVI), $Cp^R$ is an unsubstituted indenyl or substituted indenyl, and is equivalent to $Cp^R$ in the formula (XV). Further, in the formula (XVI), the metal $M^2$ represents a lanthanoid element, scandium, or yttrium, which is equivalent to the metal $M^1$ in the formula (XV).

The metallocene complex represented by the formula (XVI) includes a silyl amide ligand represented by [—N(SiR$_3$)$_2$]. Groups represented by R ($R^E$ to $R^J$) in the silyl amide ligand each independently represent a hydrogen atom or an alkyl group having 1 to 3 carbon atoms, and it is preferred that at least one of $R^E$ to $R^J$ represents a hydrogen atom. With at least one of $R^E$ to $R^J$ representing a hydrogen atom, the catalyst can be synthesized with ease. Further, the alkyl group is preferably a methyl group.

The metallocene complex represented by the formula (XVI) further includes 0 or 3, preferably 0 to 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When a plurality of neutral Lewis bases represented by L are incorporated, respective L may be the same as or different from each other.

The metallocene complex represented by the general formula (XVI) may be present as monomers or as dimers or multimers having two or more monomers.

On the other hand, an organic aluminum compound to be used for generating the metallocene-based composite catalyst is represented by a general formula $AlR^KR^LR^M$, where $R^K$ and $R^L$ each independently represent a univalent hydrocarbon group having 1 to 20 carbon atoms or a hydrogen atom and $R^M$ represents a univalent hydrocarbon group having 1 to 20 carbon atoms, with the $R^M$ being either the same as or different from $R^K$ or $R^L$. Examples of the univalent hydrocarbon groups having 1 to 20 carbon atoms include a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

Specific examples of the organic aluminum compound include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. These organic aluminum compounds may be contained alone or in combination of two or more. The amount of the organic aluminum compound to be used for generating the metallocene-based composite catalyst is preferably 1-fold mol to 50-fold mol, and more preferably about 10-fold mol, with respect to the metallocene complex.

In the third polymerization catalyst composition, a specific example of the boron anion forming the two-component catalyst includes a tetravalent boron anion. Examples thereof may include: a tetraphenyl borate, a tetrakis(monofluorophenyl)borate, a tetrakis(difluorophenyl)borate, a tetrakis(trifluorophenyl)borate, a tetrakis(tetrafluorophenyl) borate, a tetrakis(pentafluorophenyl)borate, a tetrakis (tetrafluoromethylphenyl)borate, a tetra(tolyl)borate, a tetra (xylyl)borate, a (tripheyl, pentafluorophenyl)borate, a [tris (pentafluorophenyl), phenyl]borate, and a tridecahydride-7,8-dicarbaundecaborate, with the tetrakis(pentafluorophenyl) borate being preferred.

The boron anion may be used as an ionic compound combined with cation. Examples of the cation include a carbonium cation, an oxonium cation, an ammonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation, and more specifically, an example of the tri(substituted phenyl)carbonium cation includes a tri(methylphenyl)carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl) phosphonium cation, and a tri(dimethylphenyl)phosphonium cation. Of those cations, the N,N-dialkylanilinium cations or the carbonium cations are preferred, and the N,N-dialkylanilinium cations are particularly preferred. Therefore, preferred examples of the ionic compound include a N,N-dimethylanilinium tetrakis(pentafluorophenyl)borate and a triphenylcarbonium tetrakis(pentafluorophenyl)borate. The content of the ionic compound including a boron anion and a cation may preferably be added by 0.1-fold mol to 10-fold mol, and more preferably by about 1-fold mol, with respect to the metallocene-based composite catalyst.

Although it is required to use the above metallocene-based composite catalyst and the above boron anion in the third polymerization catalyst composition, the presence of a boron anion in the reaction system for reacting the metallocene catalyst represented by the formula (XVI) with the organic aluminum compound would not allow the synthesis of the metallocene-based composite catalyst of the formula (XV). Accordingly, preparation of the above-described third polymerization catalyst composition requires the metallocene-based composite catalyst to be synthesized in advance and isolated and purified before combined with a boron anion.

Preferred examples of the co-catalyst that can be contained in the third polymerization catalyst composition may include an organic aluminum compound represented by the $AlR^K R^L R^M$, and also include an aluminoxane. The aluminoxane is preferably an alkyl aluminoxane. Examples of the alkyl aluminoxane include as methylaluminoxane (MAO) and modified methylaluminoxanes. Preferred examples of the modified methylaluminoxane include MMAO-3A (manufactured by Tosoh Finechem Corporation). These aluminoxanes may be contained alone or in combination of two or more.

—Coupling Step—

The coupling step is for coupling polymers disposed at least part of (e.g., the end portion) the polymer chains of the synthesized polyisoprene obtained in the polymerization step.

In the coupling step, coupling reaction (or specifically denaturing the ends of polymer chains) is preferably performed when the polymerization reaction reaches 100%.

The coupling agent used for the coupling reaction is not particularly limited and may be selected as appropriate depending on the application thereof. Examples the coupling agent include, for example, (i) a tin-containing compound, such as bis(maleic acid-1-octadecyl)dioctyltin(IV), (ii) an isocyanate compound, such as 4,4'-diphenylmethanediisocyanate, and (iii) an alkoxysilane compound, such as glycidylpropyltrimethoxysilane. These coupling agents may be used alone or in combination of two or more thereof.

Among them, bis(maleic acid-1-octadecyl)dioctyltin(IV) is preferable in terms of its high reaction efficiency and low gel-formation property.

The coupling reaction couples the polymer chains to provide polymers having high molecular weight. The coupling reaction also inhibits occurrence of resolutions other than hydrolysis to prevent the number average molecular weight (Mn) from decreasing.

The reaction temperature of the coupling reaction is not particularly limited and may be selected as appropriate depending on the application thereof. The temperature is, however, preferably 10° C. to 100° C., and more preferably 20° C. to 80° C.

The reaction temperature of 10° C. or higher can prevent a significant decrease in reaction rate, and that of 100° C. or lower can prevent the gelation of polymers.

The reaction time of the coupling reaction is not particularly limited and may be selected as appropriate depending on the application thereof. The reaction time is, however, preferably 10 minutes to 1 hour.

The reaction time of 10 minutes or longer allows the reaction to occur satisfactorily, and that of 1 hour or shorter prevents the gelation of the polymers.

—Cleaning Step—

The cleaning step is for cleaning the polyisoprene obtained in the polymerization step. The medium used in the cleaning is not particularly limited and may be selected as appropriate depending on the application thereof. Examples of the medium include methanol, ethanol, and isopropanol.

<<Isoprene Copolymer>>

—Compounds Other than Isoprene—

Compounds other than isoprene that may be copolymerized with isoprene are not particularly limited and may be selected as appropriate depending on the application thereof. Examples of such compounds include, for example, a conjugated diene compound, such as 1,3-butadiene, 1,3-pentadiene, 2,3-dimethyl butadiene; aromatic vinyl compound, such as styrene; and an unconjugated olefin compound, such as ethylene, propylene, 1-butene, 1-pentene, 1-hexene, 1-heptene, and 1-octene. These compounds may be used alone or in combination of two or more.

Among them, 1,3-butadiene and styrene are preferable in terms of controlling the molecular weight.

—Cis-1,4 Bond Content—

The cis-1,4 bond content in a unit derived from the isoprene in the isoprene copolymer is not particularly limited and may be selected as appropriate depending on the application thereof. The bond content is, however, preferably is 90% or more, more preferably 95% or more, and most preferably 98% or more.

The isoprene copolymer having cis-1,4 bond content of 90% or more can develop intended strain-induced crystallinity.

The synthesized polyisoprene having the cis-1,4 bond content within the above "more preferable" or "most preferable" range is advantageous in terms of improved durability associated with strain-induced crystallinity.

It should be noted that the cis-1,4 bond content is not the ratio of the cis-1,4 bond to the whole isoprene copolymer but is the amount of the cis-1,4 bond in the unit derived from the isoprene (this applies also to trans-1,4 bond content and 3,4-vinyl bond content which are described below).

—Trans-1,4 Bond Content—

The trans-1,4 bond content of the isoprene copolymer is not particularly limited and may be selected as appropriate depending on the application thereof. The bond content is, however, preferably 10% or less, more preferably 5% or less.

The isoprene copolymer having trans-1,4 bond content of 10% or less can develop intended strain-induced crystallinity.

The isoprene copolymer having the trans-1,4 bond content within the above "more preferable" range is advantageous in terms of improved durability associated with strain-induced crystallinity.

—3,4-Vinyl Bond Content—

The 3,4-vinyl bond content of isoprene in a unit derived from the isoprene in the isoprene copolymer is not particularly limited and may be selected as appropriate depending on the application thereof. The bond content is, however, preferably 5% or less, more preferably 2% or less.

The isoprene copolymer having the 3,4-vinyl bond content of 5% or less can develop intended strain-induced crystallinity.

The synthesized polyisoprene having the 3,4-vinyl bond content within the above "more preferable" range is advantageous in terms of improved durability associated with strain-induced crystallinity.

The isoprene copolymer having the unit derived from isoprene with the 3,4-vinyl bond content of 5% or less is obtained by, for example, a polymerization of a predetermined time (i.e., 30 minutes to 2 days) at a low temperature (i.e., −100° C.) using the first, the second, or the third polymerization catalyst composition which are described above.

—Content of Unit Derived from Isoprene in Isoprene Copolymer—

The content of the unit derived from isoprene in the isoprene copolymer is not particularly limited and may be selected as appropriate depending on the application thereof. The content is, however, preferably 5 mol % to 95 mol %.

The isoprene copolymer having 5 mol % or more isoprene-derived unit allows the isoprene to exhibit its properties satisfactorily, and that having 95 mol % or less isoprene-derived unit allows a copolymer component other than isoprene to exhibit the properties satisfactorily.

—Chain Structure—

The chain structure is not particularly limited and may be selected as appropriate depending on the application thereof. Examples of the chain structure include, for example, a block copolymer, a random copolymer, a tapered copolymer, and an alternating copolymer.

—Block Copolymer—

The structure of the block copolymer is any one of $(A-B)_x$, $A-(B-A)_x$, and $B-(A-B)_x$, wherein A is a block portion composed of monomer units of isoprene, B is a block portion composed of monomer units of a compound other than isoprene, and x is an integer of 1 or more. A block copolymer containing multiple (A-B) or (B-A) structures is referred to as a multi-block copolymer.

—Random Copolymer—

The structure of the random copolymer has a random arrangement of monomer units of isoprene and monomer units of a compound other than isoprene.

—Tapered Copolymer—

The tapered copolymer contains random copolymers and block copolymer in a mixed manner. Specifically, the tapered copolymer contains at least either a block portion (or block structure) composed of monomer units of isoprene or a block portion composed of monomer units of a compound other than isoprene, and a random portion (or random structure) composed of monomer units of isoprene and those of a compound other than isoprene that are randomly arranged.

The structure of the tapered copolymer shows that the composition of the isoprene component and the compound component other than isoprene has continuous or discontinuous distribution.

—Alternating Copolymer—

The alternating copolymer contains isoprene units and units of a compound other than isoprene that are arranged alternately. Specifically the structure of the alternating copolymer has a molecular chain structure of -ABABABAB-, wherein A represents a monomer unit of isoprene and B represents a monomer unit of a compound other than isoprene.

—Method of Producing Isoprene Copolymer—

Next, a method of producing the isoprene copolymer will be described in detail. However, the producing method described in detail below is merely an example. The isoprene copolymer can be produced by polymerizing isoprene monomers and monomers of a compound other than isoprene in the presence of a polymerization catalyst composition.

The method of producing the isoprene copolymer includes at least a polymerization step, and further includes coupling, cleaning, and other steps appropriately selected as necessary.

—Polymerization Step—

The polymerization step is for copolymerizing isoprene monomers and monomers of a compound other than isoprene.

In the polymerization step, except that the aforementioned first, second, or third polymerization catalyst composition is used, isoprene monomers and monomers of a compound other than isoprene can be copolymerized in a manner similar to that used conventionally in producing polymers using a coordination ion polymerization catalyst. The polymerization catalyst compositions used in the present invention have been already described in the above.

The catalyst that may be used in the polymerization step is the aforementioned first, second, or third polymerization catalyst composition.

Any method can be employed as the polymerization method including, for example, solution polymerization, suspension polymerization, liquid phase bulk polymerization, emulsion polymerization, vapor phase polymerization, and solid state polymerization. In addition, in the case of using a solvent for polymerization reaction, any solvent may be used that is inert to the polymerization reaction, including, for example, toluene, cyclohexane, n-hexane and mixtures thereof.

In the case of using a polymerization catalyst composition, the polymerization step can be carried out in either one of the following manners. That is, for example, (1) the components forming the polymerization catalyst composition may be separately provided in the polymerization reaction system containing isoprene monomers and monomers of a compound other than isoprene, to thereby prepare the polymerization catalyst composition in the reaction system, or (2) the polymerization catalyst composition prepared in advance may be provided into the polymerization reaction system. Further, the manner (2) also includes providing the metallocene complex (active species) activated by the co-catalyst.

Further, in the polymerization step, a terminator such as methanol, ethanol, and isopropanol may be used to stop the polymerization.

In the polymerization step, the polymerization reaction of the isoprene and a compound other than isoprene may be preferably performed in an inert gas atmosphere, and preferably in nitrogen or argon gas atmosphere. The polymerization temperature of the polymerization reaction is not particularly limited, and preferably in a range of, for example, −100° C. to 200° C., and may also be set to temperatures around room temperature. An increase in polymerization temperature may reduce the cis-1,4-selectivity in the polymerization reaction. The polymerization reaction is preferably performed under pressure in a range of 0.1 MPa to 10.0 MPa so as to allow the isoprene and the compound other than isoprene to be sufficiently introduced into the polymerization system. Further, the reaction time of the polymerization reaction is not particularly limited, but may preferably be in a range of, for example, 1 second to 10 days, which may be selected as appropriate depending on the conditions such as the type of the monomers to be polymerized, the type of the catalyst, and the polymerization temperature.

—Coupling Step—

The coupling step is for coupling polymers by using at least part (e.g., the end portion) of the polymer chains of the isoprene copolymers obtained in the polymerization step.

In the coupling step, coupling reaction (or specifically denaturing the ends of polymer chains) is preferably performed when the polymerization reaction reaches 100%.

The coupling agent used for the coupling reaction is not particularly limited and may be selected as appropriate depending on the application thereof. Examples the coupling agent include, for example, (i) a tin-containing compound, such as bis(maleic acid-1-octadecyl)dioctyltin(IV), (ii) an isocyanate compound, such as 4,4'-diphenylmethanediisocyanate, and (iii) an alkoxysilane compound, such as glycidylpropyltrimethoxysilane. These coupling agents may be used alone or in combination of two or more.

Among them, bis(maleic acid-1-octadecyl)dioctyltin(IV) is preferable in terms of its high reaction efficiency and low gel-formation property.

The coupling reaction couples the polymer chains to provide polymers having high molecular weight. The coupling reaction also inhibits occurrence of resolutions other than hydrolysis to prevent the number average molecular weight (Mn) from decreasing.

The reaction temperature of the coupling reaction is not particularly limited and may be selected as appropriate depending on the application thereof. The temperature is, however, preferably 10° C. to 100° C., and more preferably 20° C. to 80° C.

The reaction temperature of 10° C. or higher prevents a significant decrease in reaction rate, and that of 100° C. or lower prevents the gelation of polymers.

The reaction time of the coupling reaction is not particularly limited and may be selected as appropriate depending on the application thereof. The reaction time is, however, preferably 10 minutes to 1 hour.

The reaction time of 10 minutes or longer allows the reaction to occur satisfactorily, and that of 1 hour or shorter can prevent the gelation of the polymers.

—Cleaning Step—

The cleaning step is for cleaning the isoprene copolymer obtained in the polymerization step. The medium used in the cleaning is not particularly limited and may be selected as appropriate depending on the application thereof. Examples of the medium include methanol, ethanol, and isopropanol.

The synthesized polyisoprene and the isoprene copolymer have been already described in the above.

The total amount (total content) of the polymer (the synthesized polyisoprene, the isoprene copolymer, or the synthesized polyisoprene and the isoprene copolymer) contained in the rubber component is not particularly limited and may be selected as appropriate depending on the application thereof. However, the content is preferably 15 mass % to 100 mass %.

The rubber component containing the polymer in an amount of 15 mass % or more in total amount allows the polymer to exhibit its property satisfactorily.

<<Other Components>>

The above-mentioned other rubber components are not particularly limited and may be selected as appropriate depending on the application thereof. Examples of the rubber components include butadiene rubber (BR), styrene butadiene rubber (SBR), acrylonitrile-butadiene rubber (NBR), chloroprene rubber, ethylene-propylene rubber (EPM), ethylene-propylene unconjugated-diene rubber (EPDM), polysulfide rubber, silicone rubber, fluoro-rubber, and urethane rubber. These rubber components may be used alone or in combination of two or more.

<Filler>

The filler is not particularly limited and may be selected as appropriate depending on the application thereof. Examples of the filler include a carbon black and an inorganic filler, and preferably at least one selected from the carbon black and the inorganic filler. The carbon black is more preferably contained in the rubber composition. The filler is added to the rubber composition to reinforce the rubber composition.

The amount (content) of the filler is not particularly limited and may be selected as appropriate depending on the application thereof. The content is, however, preferably 10 mass parts to 75 mass parts, more preferably 20 mass parts to 75 mass parts, and most preferably 30 mass parts to 60 mass parts, per 100 mass parts rubber component.

The filler contained in an amount of 10 mass parts or more exhibits its effect. The filler contained in an amount of 75 mass parts or less can be reliably blended into the rubber component, and the filler contained in this amount can thus improve the performance of the rubber composition.

The rubber composition containing the filler in an amount within the above "more preferable" or "most preferable" range is advantageous in terms of processability, low-loss performance, and durability.

—Carbon Black—

The carbon black is not particularly limited and may be selected as appropriate depending on the application thereof. Examples of the carbon black include FEF, GPF, SRF, HAF, N339, IISAF, ISAF, and SAF. These examples of the carbon black may be used alone or in combination of two or more.

The nitrogen adsorption specific surface area of the carbon black, which is determined according to $N_2SA$ JIS K 6217-2: 2001, is not particularly limited and may be selected as appropriate depending on the application thereof. However, the nitrogen absorption specific surface area of the carbon black is preferably 20 $m^2/g$ to 150 $m^2/g$, and more preferably 35 $m^2/g$ to 145 $m^2/g$.

The rubber composition having the carbon black with 20 $m^2/g$ or more nitrogen adsorption specific surface area ($N_2SA$) can prevent deterioration in durability of the obtained rubber to achieve sufficient crack growth resistance, and that having the carbon black with 100 $m^2/g$ or less nitrogen adsorption specific surface area ($N_2SA$) can improve low-loss performance to enhance workability.

The content of the carbon black to 100 mass parts rubber component is not particularly limited and may be selected as appropriate depending on the application thereof. However, the content of the carbon black to 100 mass parts rubber component is preferably 10 mass parts to 100 mass parts, more preferably 10 to 70 mass parts, and most preferably 20 mass parts to 60 mass parts.

The rubber composition containing the carbon black in an amount of 10 mass parts or more can prevent decline in breaking resistance caused by insufficient reinforcement, and the rubber composition containing 100 mass parts or less carbon black can prevent deterioration in procecessability and low-loss performance.

The rubber composition containing the carbon black in an amount within the above "more preferable" or "most preferable" range is advantageous in terms of maintaining a balance in each of the performances.

—Inorganic Filler—

The inorganic filler is not particularly limited and may be selected as appropriate depending on the application thereof. Examples of the inorganic filler include silica, aluminum hydroxide, clay, alumina, talc, mica, kaolin, glass balloon, glass beads, calcium carbonate, magnesium carbonate, magnesium hydroxide, magnesium oxide, titanium oxide, potassium titanate, and barium sulfate. These inorganic fillers may be used alone or in combination of two or more.

In using an inorganic filler, a silane coupling agent may also be used as appropriate.

<Crosslinking Agent>

The crosslinking agent is not particularly limited and may be selected as appropriate depending on the application thereof. Examples of the crosslinking agent include a sulfur-containing crosslinking agent, an organic peroxide-containing crosslinking agent, an inorganic crosslinking agent, a polyamine crosslinking agent, a resin crosslinking agent, a sulfur compound-based crosslinking agent, an oxime-nitrosamine-based crosslinking agent, and sulfur, with the sulfur-containing crosslinking agent being more preferred as the rubber composition for a tire.

The content of the crosslinking agent is not particularly limited and may be selected as appropriate depending on the application thereof. The preferred content thereof is 0.1 mass parts to 20 mass parts per 100 mass parts rubber component.

The rubber composition containing the crosslinking agent in an amount of 0.1 mass parts or more can develop crosslinking, and the rubber composition containing the crosslinking agent in an amount of 20 mass parts or less can prevent the crosslinking that may be caused by part of the crosslinking agent during kneading, and can prevent the loss of physical properties of vulcanizate.

<Other Components>

The rubber composition may further contain a vulcanization accelerator in addition to the above components. Examples of compounds that can be used as the vulcanization accelerator include guanidine-based compounds, aldehyde-amine-based compounds, aldehyde-ammonia-based compounds, thiazole-based compounds, sulfenamide-based compounds, thiourea-based compounds, thiuram-based compounds, dethiocarbamate-based compounds, and xanthate-based compounds.

Further, if necessary, any known agent such as a softening agent, a vulcanizing co-agent, a colorant, a flame retardant, a lubricant, a foaming agent, a plasticizer, a processing aid, an antioxidant, an age resister, an anti-scorch agent, an ultraviolet rays protecting agent, an antistatic agent, a color protecting agent, and other compounding agent may be used according to the intended use thereof.

(Crosslinked Rubber Composition)

The crosslinked rubber composition according to the present invention is not particularly limited as long as it is obtained by crosslinking the rubber composition of the present invention, and may be selected as appropriate depending on the application thereof.

The conditions for the crosslinking are not particularly limited and may be selected as appropriate depending on the application thereof. However, the temperature and the heating time may preferably be in a range of 120° C. to 200° C. for 1 minute to 900 minutes.

(Tire)

The tire of the present invention is not particularly limited as long as it contains the crosslinked rubber composition of the present invention, and may be selected as appropriate depending on the application thereof.

The crosslinked rubber composition of the present invention may be used in any portion of the tire of the present invention, and the portion may be selected as appropriate depending on the application thereof. Examples of the portion include, for example, a tread, a base tread, a sidewall, a side reinforcing rubber, and a bead filler.

Among these portions, the tread is advantageous in terms of durability.

The tire can be produced by using a conventional method. For example, a carcass layer, a belt layer, a tread layer, which are composed of unvulcanized rubber and/or cords, and other members used for the production of usual tires are successively laminated on a tire molding drum, then the drum is withdrawn to obtain a green tire. Thereafter, the green tire is heated and vulcanized in accordance with an ordinary method, to thereby obtain a desired tire (for example a pneumatic tire).

(Applications Other than Tires)

The crosslinked rubber composition of the present invention may be used for applications other than tires, such as anti-vibration rubber, seismic isolation rubber, a belt (conveyor belt), a rubber crawler, and various types of hoses.

EXAMPLES

In the following, the present invention will be described in further detail with reference to Examples. However, the present invention is in no way limited to the following Examples.

Producing Example 1: Method of Producing Polymer A

A catalyst solution was first prepared by placing 150 μmol of dimethyl aluminum(μ-dimethyl) bis(pentamethylcyclopentadienyl)gadolinium [(Cp*)$_2$Gd(μ-Me)$_2$AlMe$_2$] (wherein Cp* is pentamethylcyclopentadienyl ligand), 150 μmol of triphenylcarbonium tetrakis(pentafluorophenyl)borate (Ph$_3$CB(C$_6$F$_5$)$_4$), and 21.0 mmol of triisobutylaluminum in a 1 L pressure-resistant glass reactor in a glove box under nitrogen atmosphere, and dissolving the catalyst composition in 250 g of toluene. The reactor was then taken out from the glove box 30 minutes later, and 50.0 g of isoprene was added to the reactor. Polymerization was then performed at −40° C. for 60 hours. After the polymerization, 1 mL of an isopropanol solution containing 2,2'-methylene-bis(4-ethyl-6-t-butylphenol) (NS-5) in an amount of 5 mass % was added to the reactor to stop the reaction. Then, a large amount of methanol was further added to the reactor to isolate the polymer, and the isolated polymer was vacuum dried at 70° C. to obtain a polymer A. The yield of the polymer A thus obtained was 43.1 g.

Producing Example 2: Method of Producing Polymer B

To obtain a polymer B, 6.2 μmol of tris[bis(trimethylsilyl)amide]gadolinium Gd[N(SiMe$_3$)$_2$]$_3$, 3.22 mmol of triisobutylaluminum, and 5.0 g of toluene were placed in a 1 L pressure-resistant glass reactor in a glove box under nitrogen atmosphere, and the compounds were aged for 30 minutes. Subsequently, 6.2 μmol of triphenylcarbonium tetrakis(pentafluorophenyl)borate (Ph$_3$CB(C$_6$F$_5$)$_4$) and 472.0 g of cyclohexane were placed in the reactor and the compounds were further aged for 30 minutes. The reactor was then taken out from the glove box, and 120.0 g of isoprene was added to the reactor. Polymerization was then performed at room temperature for 12 hours. After the polymerization, 1 mL of an isopropanol solution containing 2,2'-methylene-bis(4-ethyl-6-t-butylphenol) (NS-5) in an amount of 5 mass % was added to the reactor to stop the reaction. Then, a large amount of methanol was further added to the reactor to isolate the polymer, and the isolated polymer was vacuum dried at 70° C. to obtain the polymer B. The yield of the polymer B thus obtained was 103.0 g.

Producing Example 3: Method of Producing Polymer C

To obtain a polymer C, 4.65 μmol of tris[bis(trimethylsilyl)amide]gadolinium Gd[N(SiMe$_3$)$_2$]$_3$, 0.70 mmol of diisobutyl aluminum hydride, and 5.0 g of toluene were placed in a 1 L pressure-resistant glass reactor in a glove box under nitrogen atmosphere, and the compounds were aged for 30 minutes. Subsequently, 4.65 μmol of triphenylcarbonium tetrakis(pentafluorophenyl)borate (Ph$_3$CB(C$_6$F$_5$)$_4$) and 378.0 g of cyclohexane were placed in the reactor and the compounds were further aged for 30 minutes. The reactor was then taken out from the glove box, and 127.5 g of isoprene was added to the reactor. Polymerization was then performed at room temperature for 3 hours. After the polymerization, 1 mL of an isopropanol solution containing 2,2'-methylene-bis(4-ethyl-6-t-butylphenol) (NS-5) in an amount of 5 mass % was added to the reactor to stop the reaction. Then, a large amount of methanol was further added to the reactor to isolate the polymer, and the isolated polymer was vacuum dried at 70° C. to obtain the polymer C. The yield of the polymer C thus obtained was 99.0 g.

Producing Example 4: Method of Producing Polymer D

<Preparation of Catalyst>

Induced to a 100 mL glass bottle sealed with a rubber stopper after drying and nitrogen substitution were, in the stated order, 7.11 g (15.2 weight %) of a cyclohexane solution of butadiene, 0.59 mL (0.56M) of a cyclohexane solution of neodymium neodecanoato, 10.32 mL (3.23M aluminum concentration) of a toluene solution of methyl aluminoxane MAO (manufactured by Tosoh Akzo Corporation), and 7.77 mL (0.90M) of a hexane solution of diisobutyl aluminum hydride (manufactured by Kanto Chemical Co., Inc.), and the compounds were aged at room temperature for 2 minutes. Subsequently, 1.57 mL (0.95M) of a hexane solution of chlorinated diethyl aluminum (manufactured by Kanto Chemical Co., Inc.) was added, and the compounds were aged while occasionally stirred for 15 minutes. The concentration of neodymium contained in thus obtained catalyst solution was 0.010M (mol/L).

<Preparation of Polymer D>

To obtain a polymer D, a 1 L glass bottle sealed with a rubber stopper was dried and nitrogen substituted, and a cyclohexane solution of butadiene after dried and purified, and dried cyclohexane were introduced to the bottle to obtain a state where 400 g of a 12.5% cyclohexane solution was introduced. Subsequently, 1.24 mL (0.015 mmol in terms of neodymium) of the prepared catalyst solution was added. Polymerization was then performed in a water bath at 25° C. for 3 hours. Subsequently, 15 equivalents of dioctyltin octane maleate relative to neodymium were subjected to reaction at 25° C. for 1 hour, and 2 mL of a 5% isopropanol solution of an age resister 2,2'-methylene-bis(4-ethyl-6-t-butylphenol) (NS-5) was added to the bottle to stop the reaction. Then, reprecipitation was carried out in isopropanol containing a small amount of NS-5, and the polymer was dried in a drum to obtain the polymer D at the yield of substantially 100%.

Polymers A to D prepared as above and polyisoprene rubber (trade name: IR2200, JSR Corporation) were measured and evaluated with the following method to investigate the microstructure (cis-1,4 bond content), the number average molecular weight (Mn), and the molecular weight distribution (Mw/Mn). The results are shown in Table 1.

In addition, the gel fractions of the polymers A to D prepared as above and polyisoprene rubber (trade name: IR2200, JSR Corporation) were also measured and evaluated with the following method. The results are shown in Table 1.

<Method of Analyzing Synthesized Polyisoprene>

(1) Microstructure (Cis-1,4 Bond Content)

The microstructures were calculated from the integral ratio between the peaks obtained from $^1$H-NMR and $^{13}$C-NMR [$^1$H-NMR: δ4.6-4.8 (=CH$_2$ of 3,4-vinyl unit), 5.0-5.2 (—CH= of 1,4-unit); 13C-NMR: δ23.4 (1,4-cis unit), 15.9 (1,4-trans unit), 18.6 (3,4-unit)]. The number average molecular weight (Mn) and molecular weight distribution (Mw/Mn) were obtained by GPC by using polystyrene as a standard substance.

(2) Number Average Molecular Weight (Mn) and Molecular Weight Distribution (Mw/Mn)

The number average molecular weight (Mn) and molecular weight distribution (Mw/Mn) were measured through gel permeation chromatography [GPC: HLC-8020 (manufactured by Tosoh Corporation)] by using a refractometer as a detector, and calculated in terms of polystyrene by referencing monodisperse polystyrene as a standard. The column was GMHXL (manufactured by Tosoh Corporation), the elute was tetrahydrofuran, and the measurement temperature was 40° C.

(3) Gel Fraction

To determine the gel fraction, 12 mg of sample polymers were placed in sample bottles containing 5 cc of tetrahydrofuran, and the sample bottles were allowed to stand overnight. The solutions were then passed through a 0.45 μm PTFE filter to conduct GPC. The sample areas (mV) of RIs obtained by GPC were divided by sample weights used to calculate the percentage.

(4) Amount of Catalyst Residue

The amount of catalyst residue (i.e., amount of residual metal) was measured by performing elemental analysis.

TABLE 1

|  | Polymer A | Polymer B | Polymer C | IR2200 | Polymer D |
|---|---|---|---|---|---|
| Mn (×1000) | 1656 | 586 | 775 | 341 | 2390 |
| Mw/Mn | 2.66 | 2.68 | 2.63 | 4.87 | 2.19 |
| Cis-1,4 bond (%) | 99.2 | 98.2 | 97.6 | 95.0 | 96.9 |
| Amount of catalyst residue (ppm) | 4530 | 280 | 60 | 530 | 220 |
| Gel fraction (%) | 14 | 15 | 14 | 25 | 67 |

<Method of Evaluating Rubber Composition>

Vulcanized rubbers obtained by preparing and vulcanizing rubber compositions having the compounding formulation shown in Table 2 were evaluated by the following method to measure (1) breaking resistance and (2) abrasion resistance. The results of the measurement are shown in Table 3.

(1) Breaking Resistance (Expressed by Index)

A tensile test was conducted at room temperature in accordance with JIS K 6301-1995 to measure the tensile strength (Tb) of the vulcanized rubber compositions. The tensile strengths, expressed by an index obtained by determining the tensile strength of Comparative Example 1 as 100, are shown in Table 3. A greater index value indicates better breaking resistance.

(2) Abrasion Resistance (Expressed by Index)

The abrasion resistance was measured with a Lambourn abrasion testing machine at a slip rate of 60% at room temperature. The abrasion resistance was expressed by using the reciprocal of the abrasion mount of Comparative Example 1 as 100. A greater index value indicates better abrasion resistance.

TABLE 2

|  | Component | Parts by mass |
|---|---|---|
| Master batch | Polymer *1 | 50.0 |
|  | Natural rubber (NR) *2 | 50.0 |
|  | Carbon black ISAF *3 | 45.0 |
|  | Stearic acid | 2.0 |
|  | Wax *4 | 2.0 |
|  | Age register 6C *5 | 1.0 |
| Final batch | Zinc white | 3.0 |
|  | Vulcanization accelerator TBBS *6 | 1.0 |
|  | Sulfur | 1.4 |

*1: Polymers A to D prepared as above and polyisoprene rubber (trade name: IR2200, JSR Corporation)
*2: RSS #3
*3: Seast 6 (manufactured by Tokai Carbon Co., Ltd.)
*4: Microcrystalline wax: Ozoace-0280 (manufactured by Nippon Seiro Co., Ltd.)
*5: N-(1,3-dimethylbutyl)-N'-p-phenylenediamine (NOCRAC 6C), manufactured by Ouchi Shinko Chemical Industrial Co., Ltd.
*6: N-tert-butyl-2-benzothiazilsulfenicamide, NOCCELER NS (manufactured by Ouchi Shinko Chemical Industrial Co., Ltd.)

TABLE 3

|  | Example 1 Polymer A | Example 2 Polymer B | Example 3 Polymer C | Comparative Example 1 IR2200 | Comparative Example 2 Polymer D |
|---|---|---|---|---|---|
| Breaking resistance | 113 | 106 | 103 | 100 | 70 |
| Abrasion resistance | 112 | 104 | 103 | 100 | 63 |

From Tables 2 and 3, the rubber composition containing synthesized polyisoprene having 20% or less gel fraction provides a crosslinked rubber composition with improved durability (i.e., breaking resistance and abrasion resistance).

INDUSTRIAL APPLICABILITY

The polymer and the rubber composition containing the polymer of the present invention can be suitably used in tire members, particularly in the tread member of tire.

The invention claimed is:

1. A method for producing a rubber composition comprising a rubber component, wherein the rubber component contains at least a polymer that comprises a synthesized polyisoprene or an isoprene copolymer and that has 20% or less gel fraction,
    wherein the polymer contains a catalyst residue in an amount of 300 ppm or less,
    wherein the rubber component contains the polymer by an amount in a range of 15 mass % to 100 mass % in total,
    wherein the polymer contains nitrogen in an amount of less than 0.02 mass %,
    wherein the synthesized polyisoprene is obtained by polymerizing isoprene monomers with a first, second, or third polymerization catalyst composition, wherein the isoprene copolymer is obtained by copolymerizing isoprene monomers and monomers of a compound other than isoprene with the first, second, or third polymerization catalyst composition, wherein the first polymerization catalyst composition includes a polymerization catalyst composition including at least one complex selected from a group consisting of: a metallocene complex represented by the following general formula (I); a metallocene complex represented by the following general formula (II); and a half metallocene cation complex represented by the following general formula (III):

[Formula 1]

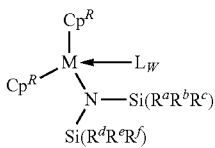

(I)

in the formula (I), M represents a lanthanoid element, scandium, or yttrium; $Cp^R$ each independently represents an unsubstituted or substituted indenyl group; $R^a$ to $R^f$ each independently represent a hydrogen atom or an alkyl group having 1 to 3 carbon atoms; L represents a neutral Lewis base; w represents an integer of 0 to 3;

[Formula 2]

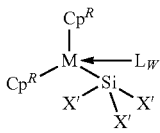

(II)

in the formula (II), M represents a lanthanoid element, scandium, or yttrium; $Cp^R$ each independently represents an unsubstituted or substituted indenyl group; X' represents a hydrogen atom, a halogen atom, an alkoxy group, a thiolate group, an amide group, a silyl group, or a hydrocarbon group having 1 to 20 carbon atoms; L represents a neutral Lewis base; and w represents an integer of 0 to 3; and Formula 3

(III)

in the formula (III), M represents a lanthanoid element, scandium, or yttrium; $Cp^{R'}$ each independently represents an unsubstituted or substituted cyclopentadienyl, indenyl or fluorenyl group; X represents a hydrogen atom, a halogen atom, an alkoxy group, a thiolate group, an amide group, a silyl group, or a hydrocarbon group having 1 to 20 carbon atoms; L represents a neutral Lewis base; w represents an integer of 0 to 3; and [B] represents a non-coordinating anion, wherein the second polymerization catalyst composition includes a rare earth element compound or a reactant of the rare earth element compound and a Lewis base, with no bond formed between the rare earth element and carbon, and wherein the third polymerization catalyst composition includes a metallocene-based composite catalyst represented by the following formula (A):

$$R_aMX_bQYb \qquad (A)$$

in the formula (A), R each independently represents an unsubstituted or substituted indenyl group, the R being coordinated with M; M represents a lanthanoid element, scandium, or yttrium; X each independently represents a hydrocarbon group having 1 to 20 carbon atoms, the X being m-coordinated with M and Q; Q represents a Group 13 element in the periodic table; Y each independently represents a hydrocarbon group having 1 to 20 carbon atoms or a hydrogen atom, the Y being coordinated with Q; and a and b each are 2.

2. The method for producing a rubber composition according to claim 1, wherein the rubber composition further comprises a filler, and wherein
the amount of the filler contained in the rubber composition is in a range of 10 to 75 mass parts per 100 mass parts rubber component.

3. A method for producing a tire containing the rubber composition produced by the method according to claim 2.

4. A method for producing a tire comprising a tread member containing the rubber composition produced by the method according to claim 2.

* * * * *